May 31, 1932.  H. H. GLASIER  1,860,534
POWER ACTUATED FURROW SLICER
Filed March 9, 1931

INVENTOR
Harold H. Glasier
BY
Westall and Wallace
ATTORNEYS

Patented May 31, 1932

1,860,534

UNITED STATES PATENT OFFICE

HAROLD H. GLASIER, OF LOS ANGELES, CALIFORNIA

POWER ACTUATED FURROW SLICER

Application filed March 9, 1931. Serial No. 521,036.

This invention relates to an attachment to slice the ground in advance of the point of a plow share. As is well known, the plows in common use are provided with a coulter stationary with respect to the plow frame and which opens the ground in advance of the plow share. In hard ground, attractive effort of great magnitude is required to draw the plow. The present invention appertains to a plow having novel furrow slicer which is power actuated and opens the ground in advance of the following plow share. It is well known that an impact action is more effective in opening the ground than a constant forcing action.

The present invention has for its objects the provision of a furrow slicer including any or all of the following features: a reciprocable disk coulter; reciprocable disk cutter together with power means for actuating the cutter; and features of design contributing to simplicity, durability and compactness of structure.

These objects together with other objects and corresponding accomplishments are obtained by means of the embodiment of the invention illustrated in the accompanying drawings, in which:—

Figure 1:
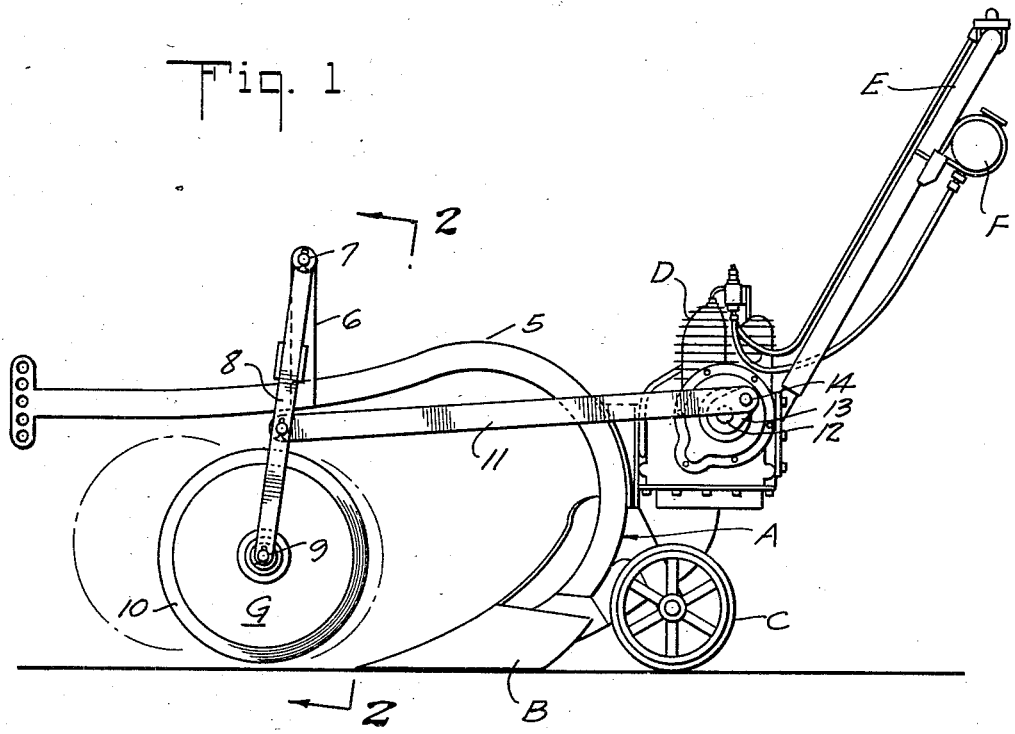
Figure 2:
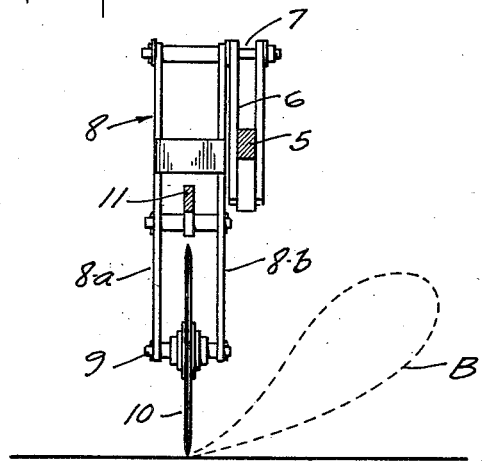

Fig. 1 is a side view of a plow equipped with a reciprocable disk coulter; and Fig. 2 is a section as seen on the line 2—2 of Fig. 1.

Referring with more particularity to the drawings, A marks a frame on which is mounted a plow share B. The rear of the plow share is provided with a gauge wheel C. Mounted on the frame is a gas engine D for operating the coulter. Handles E are provided for guiding the plow. F is a tank for holding the engine gasoline supply. A reciprocable coulter is marked G and is disposed in advance of the plow share.

The frame A includes a beam 5 serving as a draft beam. Upstanding from the beam 5 and fixed thereto by any suitable means is a standard 6. In the structure shown, the standard consists of two bars, one on each side of the beam as best shown in Fig. 2. Pivotally hung from a pin 7 at the upper end of standard 6 is a lever 8 comprising side bars denoted in Fig. 2 by 8a and 8b. Spanning the side bars 8a and 8b at their lower ends is an axle 9 serving as a journal for a coulter disk 10. A connecting rod for the coulter is pivotally secured to the frame 8. The other end of the connecting rod 11 is connected to a crank pin revolved by engine D. The motor or gas engine D is mounted on frame 5 and has a crank shaft 12 provided with a crank arm 13 having a crank pin 14 pivotally secured to connecting rod 11.

In operation, the plow may be drawn by horses, a tractor or any well known means and is guided by means of the handles E in the usual manner. The motor D is started and causes oscillation of the lever frame 8. The cutter disk 10 is thereby reciprocated to and from the plow share B. The cutter disk 10 makes an incision or cut by impact and rolling action and in advance of the plow point. The cutter disk 10 performs the function of the usual plow coulter, but much more effectively and is operated by power not derived from the tractive effort upon the plow. Rolling of the disk enables a cutter disk action in addition to the impact action, presents a changing cutting edge, and reduces wear on the coulter. The effort in drawing the plow is materially decreased.

What I claim is:—

1. An agricultural tool comprising a plow share, a freely rotatable coulter disk mounted in advance of the plow share to be bodily reciprocated to and from the latter and thereby initially slice the ground and mechanism to reciprocate the coulter.

2. An agricultural tool comprising a plow share, a freely rotatable coulter disk mounted in advance of the plow share and substantially in line with the point of the share, said disk being bodily reciprocable in the path of plow travel, and motor mechanism to reciprocate the disk.

3. An agricultural tool comprising a frame, a plow share, a lever pivotally mounted on said frame, a coulter disk rotatably mounted on said lever to idle and disposed in front of the plow share whereby said disk may be reciprocated in the path of travel of said share, a connecting rod secured to said disk, and motor mechanism to reciprocate said rod and thereby to reciprocate said coulter disk.

4. An agricultural tool comprising a frame, a plow share, a freely rotatable coulter disk disposed in advance of and substantially in line with plow point, said disk being pivotally mounted on said frame to be swung bodily whereby it may be oscillated in the path of plow travel, and motor mechanism to oscillate said disk and cause slicing of the ground in advance of said plow share.

5. An agricultural tool comprising a frame having a plow share, a cutter disk, a cutter lever on which said disk is freely journalled, said lever being pivotally mounted on said frame in advance of said share with the disk in line with said share, motor mechanism on said frame connected to said lever, to oscillate said coulter to and from said share and to cause slicing of the ground in advance of said share.

In witness that I claim the foregoing I have hereunto subscribed my name this 27th day of February, 1931.

HAROLD H. GLASIER.